United States Patent
Atluri et al.

(10) Patent No.: US 10,007,432 B2
(45) Date of Patent: Jun. 26, 2018

(54) SYSTEM AND METHOD FOR REPLACING STORAGE DEVICES

(71) Applicant: DELL PRODUCTS, L.P., Round Rock, TX (US)

(72) Inventors: Anup Atluri, Bangalore (IN); Ashokan Vellimalai, Round Rock, TX (US); Amit Pratap Singh, Allahabad (IN); Sandeep Agarwal, Bangalore (IN); Deepu Syam Sreedhar M, Calicut (IN)

(73) Assignee: Dell Products, L.P., Round Rock, TX (US)

( * ) Notice: Subject to any disclaimer, the term of this patent is extended or adjusted under 35 U.S.C. 154(b) by 82 days.

(21) Appl. No.: 14/882,409

(22) Filed: Oct. 13, 2015

(65) Prior Publication Data
US 2017/0102883 A1   Apr. 13, 2017

(51) Int. Cl.
*G06F 3/06*   (2006.01)

(52) U.S. Cl.
CPC .......... *G06F 3/0605* (2013.01); *G06F 3/061* (2013.01); *G06F 3/0619* (2013.01); *G06F 3/0631* (2013.01); *G06F 3/0647* (2013.01); *G06F 3/0653* (2013.01); *G06F 3/0673* (2013.01)

(58) Field of Classification Search
CPC ............... G06F 3/0688; G06F 12/0246; G06F 2212/7211; G06F 11/1608; G06F 11/1008; G06F 11/1092
See application file for complete search history.

(56) References Cited

U.S. PATENT DOCUMENTS

| | | | | |
|---|---|---|---|---|
| 5,537,566 A * | 7/1996 | Konno | ............ | G06F 3/0601 711/114 |
| 5,727,144 A * | 3/1998 | Brady | ............ | G06F 11/004 714/57 |
| 5,802,264 A * | 9/1998 | Chen | ............ | G06F 11/1084 714/6.12 |
| 6,088,826 A * | 7/2000 | Teich | ............ | H04L 1/20 714/774 |
| 6,154,853 A * | 11/2000 | Kedem | ............ | G06F 11/1084 711/114 |
| 6,598,174 B1 * | 7/2003 | Parks | ............ | G06F 11/008 711/162 |
| 7,103,732 B1 * | 9/2006 | Chang | ............ | G06F 12/0246 711/103 |
| 7,401,193 B1 * | 7/2008 | Ye | ............ | G06F 11/2087 711/162 |
| 7,401,248 B2 * | 7/2008 | Nakahara | ............ | G06F 11/203 714/1 |

(Continued)

*Primary Examiner* — Midys Rojas
*Assistant Examiner* — Khoa D Doan
(74) *Attorney, Agent, or Firm* — Isidore PLLC

(57) ABSTRACT

A method for copying data from a storage device that has been identified for replacement or has failed to a spare storage device. The method includes a storage controller tracking input/output statistics for several storage devices. The storage controller determines if a first storage device storing first data has been identified for replacement within the storage devices. In response to the first storage device having been identified for replacement, a first least written to data address space within the first storage device is determined based on the input/output statistics. First data contained in the first least written to data address space is copied from the first storage device to the spare storage device.

24 Claims, 5 Drawing Sheets

(56) References Cited

U.S. PATENT DOCUMENTS

| | | | | |
|---|---|---|---|---|
| 7,587,630 B1* | 9/2009 | Cassell | G06F 11/1088 | 714/47.3 |
| 7,606,971 B2* | 10/2009 | Yuasa | G06F 11/1004 | 709/232 |
| 7,636,867 B2* | 12/2009 | Abe | G06F 11/1666 | 710/302 |
| 8,082,390 B1* | 12/2011 | Fan | G06F 11/1092 | 711/114 |
| 9,513,821 B2* | 12/2016 | Cha | G06F 3/0616 | |
| 2004/0260967 A1* | 12/2004 | Guha | G06F 11/008 | 714/3 |
| 2005/0027956 A1* | 2/2005 | Tormasov | G06F 11/1451 | 711/162 |
| 2005/0086557 A1* | 4/2005 | Sato | G06F 11/1092 | 714/6.12 |
| 2005/0114728 A1* | 5/2005 | Aizawa | G06F 11/1092 | 714/6.32 |
| 2005/0283655 A1* | 12/2005 | Ashmore | G06F 11/004 | 714/6.32 |
| 2006/0015771 A1* | 1/2006 | Van Gundy | G06F 11/2094 | 714/6.32 |
| 2006/0041793 A1* | 2/2006 | Cherian | G06F 11/1092 | 714/47.1 |
| 2006/0143503 A1* | 6/2006 | Shaik | G06F 3/061 | 714/6.2 |
| 2006/0149900 A1 | 7/2006 | Terry et al. | | |
| 2006/0190682 A1* | 8/2006 | Noguchi | G06F 9/52 | 711/114 |
| 2006/0212747 A1* | 9/2006 | Okamoto | G06F 11/1092 | 714/6.12 |
| 2007/0067666 A1* | 3/2007 | Ishikawa | G06F 11/1092 | 714/6.21 |
| 2007/0067670 A1* | 3/2007 | Ebsen | G06F 11/1092 | 714/6.32 |
| 2008/0082748 A1* | 4/2008 | Liu | G06F 3/067 | 711/114 |
| 2008/0126839 A1* | 5/2008 | Sangapu | G06F 11/1092 | 714/5.11 |
| 2008/0126855 A1* | 5/2008 | Higashijima | G06F 11/0727 | 714/16 |
| 2008/0178038 A1 | 7/2008 | McNeill et al. | | |
| 2009/0031167 A1* | 1/2009 | Onabe | G06F 11/1096 | 714/6.12 |
| 2009/0077418 A1* | 3/2009 | Navarro | G06F 11/1662 | 714/16 |
| 2009/0089485 A1* | 4/2009 | Yeh | G06F 12/0246 | 711/103 |
| 2009/0150593 A1* | 6/2009 | Hamilton | G06F 3/061 | 711/101 |
| 2009/0271659 A1 | 10/2009 | Troppens et al. | | |
| 2010/0017555 A1* | 1/2010 | Chang | G06F 12/0246 | 711/103 |
| 2010/0070796 A1* | 3/2010 | Sivaperuman | G06F 11/2094 | 714/5.1 |
| 2011/0066882 A1* | 3/2011 | Walls | G06F 11/1068 | 714/6.24 |
| 2011/0153917 A1* | 6/2011 | Maita | G06F 1/3225 | 711/103 |
| 2012/0131270 A1* | 5/2012 | Hemmi | G06F 11/1088 | 711/103 |
| 2012/0131391 A1* | 5/2012 | Musolff | G06F 11/1443 | 714/48 |
| 2013/0080828 A1* | 3/2013 | Sheffield | G06F 11/1662 | 714/6.22 |
| 2013/0304965 A1* | 11/2013 | Yeh | G06F 12/0246 | 711/103 |
| 2014/0215262 A1* | 7/2014 | Li | G06F 11/0727 | 714/6.21 |
| 2014/0281260 A1* | 9/2014 | Peterson | G06F 3/0616 | 711/135 |
| 2015/0135042 A1* | 5/2015 | Im | G06F 11/1008 | 714/807 |
| 2015/0269025 A1* | 9/2015 | Krishnamurthy | G06F 11/1092 | 714/6.24 |
| 2015/0277797 A1* | 10/2015 | Lv | G06F 3/061 | 711/103 |
| 2016/0154718 A1* | 6/2016 | Chadwell | G06F 11/1092 | 714/6.22 |

* cited by examiner

FIG. 4

| | | Input/Output Statistics 414 | | Copied to Replace Drive 420 |
|---|---|---|---|---|
| SD 410 | DAS 412 | Frequecy of Reads 416 | Frequency of Writes 418 | |
| SD 1 | 0007 | 32 | 44 | No |
| SD 1 | 0004 | 13 | 57 | No |
| SD 1 | 0012 | 147 | 68 | No |
| SD 1 | 0009 | 387 | 121 | No |
| SD 1 | 0005 | 176 | 176 | No |
| SD 1 | 0011 | 212 | 258 | No |
| SD 1 | 0001 | 88 | 472 | No |
| SD 1 | 0008 | 5687 | 496 | No |
| SD 1 | 0002 | 286 | 1083 | No |
| SD 1 | 0010 | 6051 | 5324 | No |
| SD 1 | 0003 | 15730 | 8178 | No |
| SD 1 | 0006 | 24064 | 17279 | No |

DAS List 222

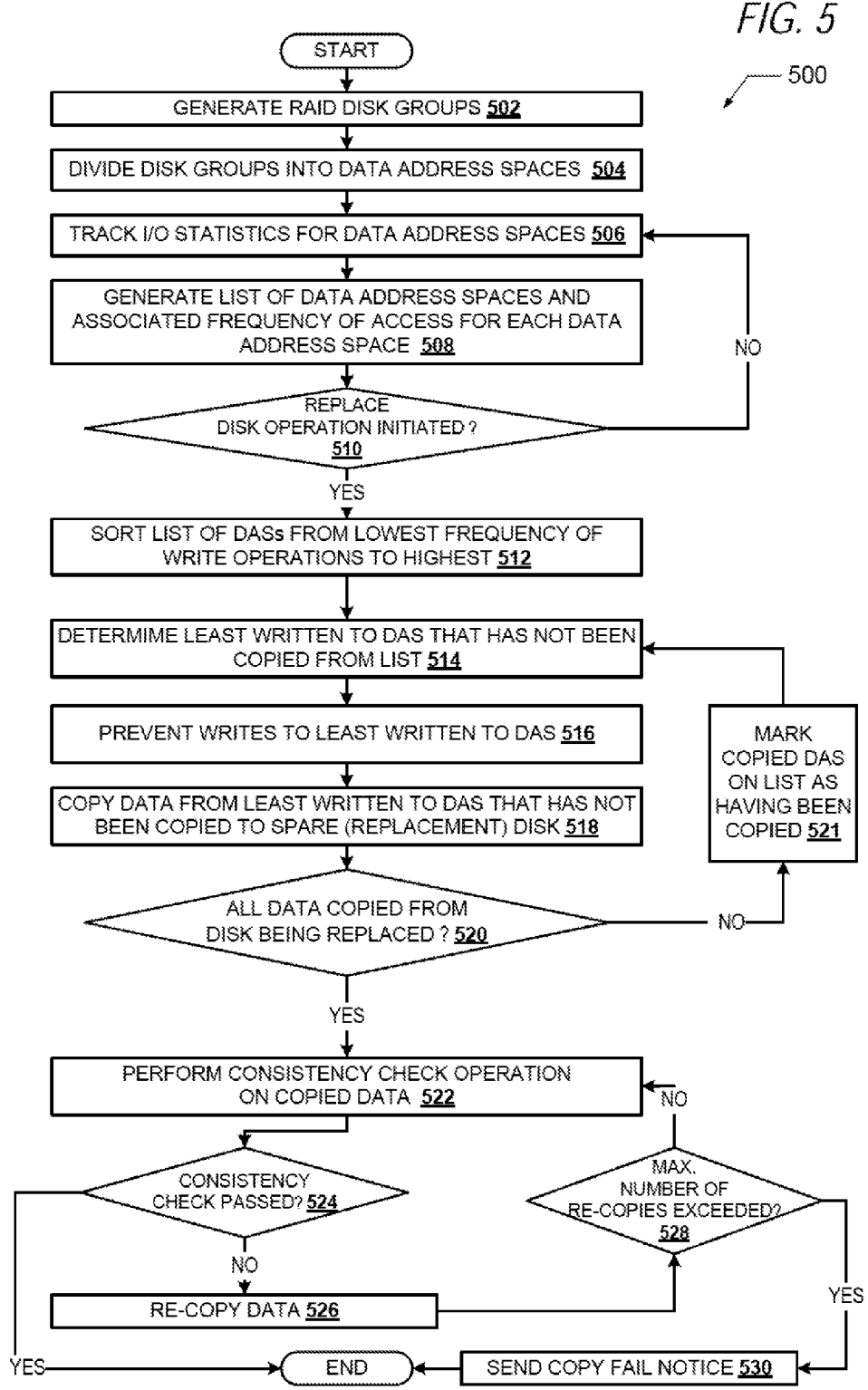

SYSTEM AND METHOD FOR REPLACING STORAGE DEVICES

BACKGROUND

1. Technical Field

The present disclosure generally relates to data storage systems and in particular to a method of replacing storage devices in a storage system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can be configured in several different configurations. The information handling system can range from a single, stand-alone computer system to a distributed, multi-device computer system, to a networked computer system with remote or cloud storage systems. Both local computer storage systems and remote or cloud storage systems can include redundant arrays of independent drives (RAID) that use hard disk drives or solid state storage drives. The drives can be configured to have different redundancy levels depending upon the amount of redundancy required.

While the load balancing features of RAID storage schemes work well for hard disk drives, they cause several disadvantages when used with solid state drives. Non-volatile memory devices used in solid state drives have a limited number of write or program erase (P/E) cycles to each cell after which the cell is unusable. Over time, the memory cells wear out due to the repeated application of electrical currents causing breakdown of insulating layers within the transistors. Typical memory devices can withstand around 100,000 P/E cycles. After the P/E cycle life is exceeded, worn out cells can deteriorate the integrity of the storage causing loss of data. Data written to worn out cells can be lost. Each solid state drive has a maximum number of program/erase cycles called the endurance life. Once the endurance life of the solid state drive is exceeded, data can no longer reliably be written to the drive and replacement of the drive is required.

When a storage device fails or is predicted to be approaching its endurance life, the data from the failed or failing device is required to be copied to another storage device. The copying process impacts the reliability and availability of the storage system. When a replacement operation is being performed, performance of the storage system is degraded. The performance of the storage system is further degraded if data changes occur to the failed or predicted to fail storage device during the copying process.

BRIEF SUMMARY

Disclosed are a method, a storage system and an information handling system (IHS) that copies data to a spare storage device from a storage device that has been identified for replacement or has failed.

According to one embodiment, the method comprises a storage controller tracking input/output statistics for several storage devices. The storage controller determines if a first storage device storing first data has been identified for replacement within the storage devices. In response to the first storage device having been identified for replacement, a first least written to data address space within the first storage device is determined based on the input/output statistics. First data contained in the first least written to data address space is copied from the first storage device to the spare storage device.

Also disclosed is a storage system that comprises several storage devices and a spare storage device. A storage controller is coupled to the storage devices and the spare storage device for controlling storage operations. The storage controller comprises logic that tracks input/output statistics for the storage devices and determines if a first storage device storing first data has been identified for replacement within the storage devices. In response to the first storage device having been identified for replacement, a first least written to data address space within the first storage device is determined based on the input/output statistics. The first data contained in the first least written to data address space is copied from the first storage device to the spare storage device.

Also disclosed is an information handling system (IHS) comprising one or more processors and a storage system in communication with the processor. The storage system comprises a plurality of storage devices, a spare storage device and a storage controller coupled to the storage devices and the spare storage device. The storage controller has firmware executing thereon to provide control of storage system operations. The firmware configures the storage controller to track input/output statistics for the storage devices and determine if a first storage device storing first data has been identified for replacement within the storage devices. In response to the first storage device having been identified for replacement, a first least written to data address space within the first storage device is determined based on the input/output statistics. The first data contained in the first least written to data address space is copied from the first storage device to the spare storage device.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4 illustrates contents of an example data address space list, in accordance with one or more embodiments; and FIG. 5 is a flow chart illustrating one example of the method by which data is copied from a storage device identified for replacement to a spare storage device, according to one or more embodiments.

DETAILED DESCRIPTION

The illustrative embodiments provide an information handling system (IHS), a storage system and a method performed within the information handling system that copies data to a spare storage device from a storage device identified for replacement.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
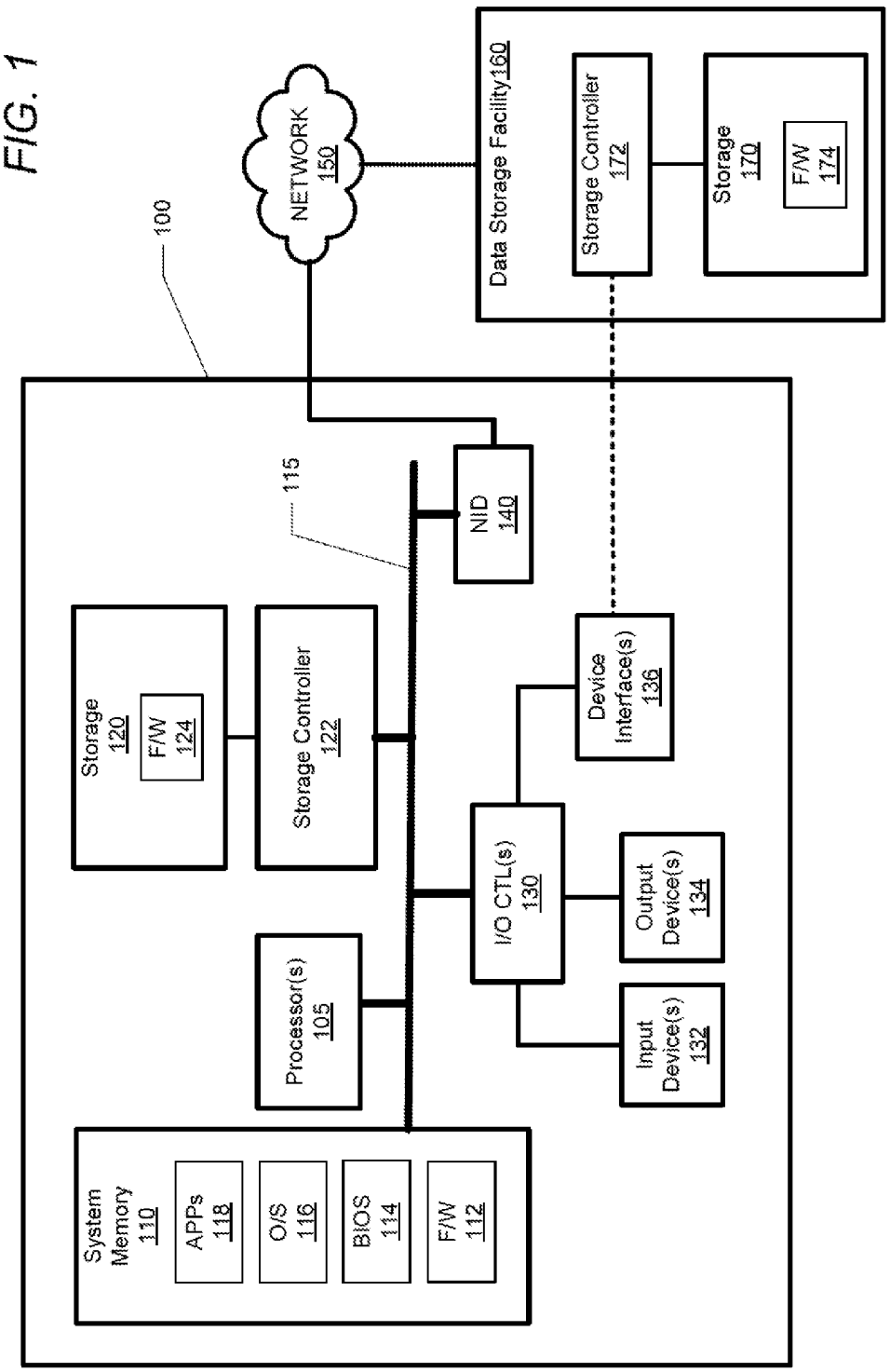
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is a storage controller 122 coupled to storage 120 within which can be stored software and/or firmware 124 and one or more sets of data (not specifically shown). As shown, system memory 110 can include therein a plurality of modules, including firmware (F/W) 112, basic input/output system (BIOS) 114, operating system (O/S) 116 and application(s) 118. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interface(s) 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s), such as a compact disk (CD), digital video disk (DVD), flash drive, or flash memory card.

In one or more embodiments, device interface(s) 136 can also provide an integration point for connecting other device(s) to IHS 100. In such implementation, device interface(s) 136 can further include General Purpose I/O interfaces such as I²C, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols.

Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of hard disk drives, solid state storage drives, solid state storage devices or other storage media. In one embodiment, data storage facility 160 is a redundant array of independent storage drives or hard drives (RAID). Data storage facility 160 includes a storage controller 172 coupled to storage 170 and within which can be stored software and/or firmware 174 and one or more sets of data (not specifically shown). In an alternate embodiment, and as represented by the dashed interconnecting lines, data storage facility 160 can be directly connected to IHS 100 as an external storage device via device interfaces 136.

Figure 2:
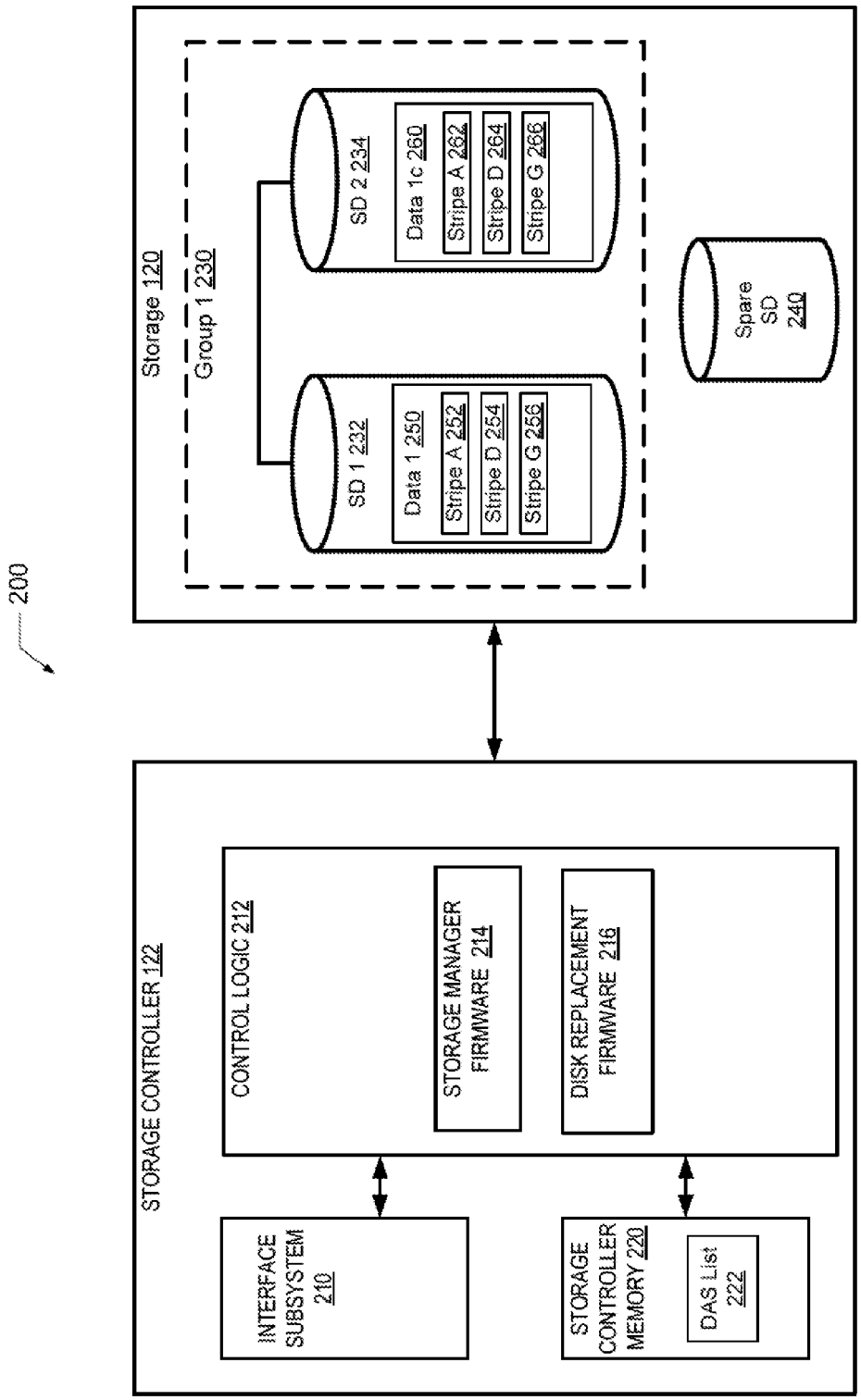
FIG. 2 illustrates a block diagram of an example storage system, in accordance with one or more embodiments.

With reference now to FIG. 2, there is illustrated one embodiment of storage subsystem 200 that can be utilized within IHS 100 and/or data facility 160 to store data, software and firmware. In the discussion of FIG. 2, reference is also made to elements described in FIG. 1. Storage subsystem 200 generally includes storage 120 and storage controller 122 that controls and manages the flow of commands and data to and from storage 120. Storage subsystem 200 can also represent storage 170 and storage controller 172 of data storage facility 160.

In one embodiment, storage 120 comprises a group 1 230 of RAID storage devices (SD) or storage drives including SD 1 232 and SD 2 234. While two drives are shown, more or fewer drives can be utilized within group 1 230. SD 2 234 contains a copy or mirror image of the data stored in SD 1 232. In some embodiments, storage 120 can include hundreds of groups including many SDs, hard disk drives or solid state drives in each group. SD 1 232 and SD 2 234 are shown storing data in a RAID 10 format. In a RAID 10 format, data is distributed in stripes and copied or mirrored onto a redundant storage device. Striping distributes the contents of files roughly equally among all disks in a set of storage devices. SD 1 232 stores data 1 250 that is comprised of stripe A 252, stripe D 254 and stripe G 256. SD 2 234 stores data 1c 260 that is comprised of stripe A 262, stripe D 264 and stripe G 266. SD 2 234 is a mirror of SD 1 232 (i.e., data 1c 260 is a copy of data 1 250).

Storage 120 further includes one or more spare storage device(s) 240. Spare storage device 240 is a storage device that is used to replace a predicted to fail or failed storage device in a RAID system. The spare disk reduces the mean time to recovery for the RAID redundancy group, thus reducing the probability of a second disk failure and the resultant data loss that would occur in any singly redundant RAID system such as a RAID 1 or RAID 10 system. For example, spare storage device 240 can replace either or both of SD 1 232 or SD 2 234 if the storage devices were predicted to fail or were to fail. Each of the storage devices (232, 234 and 240) can store a wide variety of information and data.

Storage controller 122 contains the logic necessary to read and write to storage 120. Storage controller 122 comprises interface subsystem 210, control logic 212 and storage controller memory 220. Interface subsystem 210 manages communications between control logic 212 of data storage facility 160 and system interconnect 115 (FIG. 1). Control logic 212 comprises several functional modules or processes including storage manager firmware 214 and disk replacement firmware 216. Each of the storage controller components can communicate with each other via a communication fabric, which includes specific messaging signals communicated over specific signal lines (not illustrated). Functions, modules, routines, methods and processes of the present disclosure can be provided as firmware code and/or logic within storage controller 122. The firmware code and logic can implement storage manager firmware 214 and disk replacement firmware 216.

Storage manager firmware 214 manages the reading and writing of data to storage 120 and can include data distribution techniques, such as RAID, to improve storage reliability. Storage manager firmware 214 uses RAID technology to group the storage devices within storage 120 into RAID sets. Disk replacement firmware 216 manages the copying of data to spare storage device 240 when one or more storage devices within storage 120 have been identified for replacement or have failed. Storage controller memory 220 stores data address space (DAS) list 222. DAS list 222 contains a record of each DAS allocated to each storage device and a corresponding frequency of access value for each DAS.

Those of ordinary skill in the art will appreciate that the hardware components and basic configuration depicted in FIGS. 1 and 2 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 3:
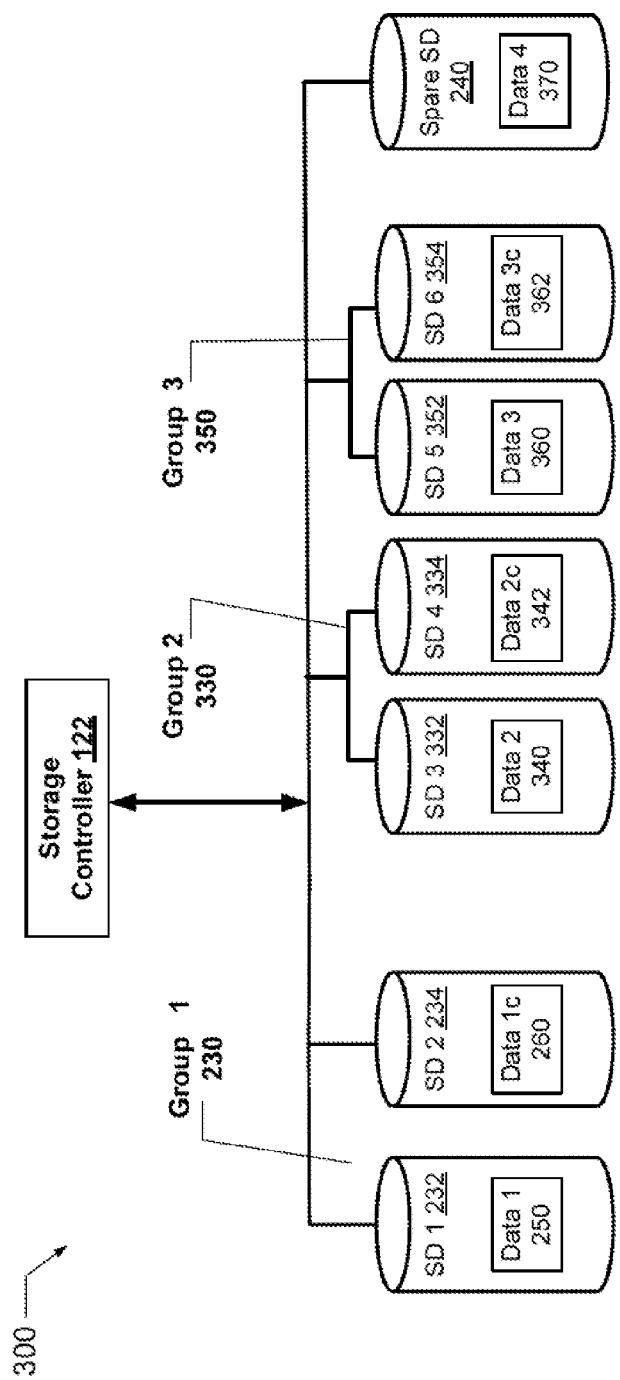
FIG. 3 illustrates an example redundant array on independent drives storage system with multiple groups and a spare storage device, in accordance with one or more embodiments.

FIG. 3 illustrates details of an example storage system 300 having a spare SD 240. In the discussion of FIG. 3, reference is also made to elements described in preceding FIGS. Turning to FIG. 3, storage system 300 includes several groups, including group 1 230, group 2 330 and group 3 350. All of the groups and their respective storage devices within each group are communicatively coupled to storage controller 122. Group 2 330 includes SD 3 332, which stores data 2 340, and SD 4 334, which stores data 2c 342. Data 2 340 and data 2c 342 can store additional stripes of RAID data such as stripes B, E and H. Span 3 350 includes SD 5 352, which stores data 3 360 and SD 6 354, which stores data 3c 362. Data 3 360 and data 3c 362 can store additional stripes of RAID data such as stripes C, F and I.

Storage controller 122 executes disk replacement firmware 216, which determines if a storage device such as SD 2 234 storing data 1c 260 has been identified for replacement or has failed. In response to SD 2 234 having been identified for replacement, a first least written to data address space on DAS list 222 within SD 2 234 is determined based on input/output statistics. The data contained in the first least written to data address space is copied from SD 2 234 to the spare storage device SD 240.

FIG. 4 illustrates example contents of DAS list 222 stored in storage controller memory 220 for one of the SDs. DAS list 222 contains a record of each DAS allocated to SD 1 232 and a corresponding frequency of access for each DAS. DAS list 222 includes an SD identifier 410 that identifies which SD contains the DASs on the list and a DAS identifier 412 which identifies the specific DAS on the SD. DAS list 222 further contains frequency of access or input/output statistics 414 for each of the DASs 412 including a frequency of reads 416 and a frequency of writes 418. The frequency of reads 416 is how often data is read from the specific DAS 412 and the frequency of writes is how often data is written to the specific DAS 412. FIG. 4 is shown sorted based on the frequency of writes 418 from the lowest frequency of writes to the highest frequency of writes. DAS list 222 also contains a copied to replacement drive tag or indicator 420 that identifies if the data contained in DAS 412 has been copied to the replacement or spare drive. The contents of DAS list 222 are automatically updated for each read/write operation that occurs to each DAS by storage controller 122. DAS list 222 is stored in a persistent storage location such as storage controller memory 220.

FIG. 5 illustrates a flowchart of an exemplary method by which IHS 100 and storage controller 122 presented within the preceding figures perform different aspects of the processes that enable one or more embodiments of the disclosure. Generally, method 500 represents a storage controller implemented method to copy data from a storage device that has been identified for replacement or has failed to a spare storage device.

The description of method 500 is provided with general reference to the specific components illustrated within the preceding FIGS. 1-4. Generally method 500 is described as being implemented via storage controller 122 and control logic 212 and particularly the execution of code provided by disk replacement firmware 216 acting within storage controller 122. It is however appreciated that certain aspects of the described methods may be implemented via other processing devices and/or execution of other code.

Referring to FIG. 5, method 500 begins at the start block and proceeds to block 502 where storage controller 122 initializes the RAID storage system 300 by generating raid disk groups such as group 1 230, group 2 330 and group 3 350 within storage system 300. The initialization also includes storage controller 122 dividing each of the disk groups into multiple DASs 412 (block 504). Storage controller 122 tracks the input/output statistics 414 for each of the DASs 412 including the frequency of reads 416 and the frequency of writes 418 for each of the DASs 412 (block 506). Storage controller 122 generates a DAS list 222 containing all of the DASs 412 in a group and the associated frequency of access or input/output statistics 414 for each of the DASs 412 in the group (block 508). When DAS list 222 is initially created the frequency of access is zero for all DASs and the frequency of access is then updated by storage controller 122 for each read/write cycle to the specific DAS.

At decision block 510, storage controller 122 determines if one or more of the SDs (i.e. SD 1 232, SD 2 234, SD 3 332, SD 4 334, SD 5 352 and SD 6 354) storing data (i.e. data 1 250, data 1c 260, data 2 340, data 2c 342, data 3 360, data 2c 362) have been identified for replacement or have failed within storage system 300 such that a replace disk operation has been initiated. The process by which a storage controller identifies disks that have failed and/or receives information triggering the disk replacement operation is known to those skilled in the art and as such will not be described herein.

In response to none of the SDs having been identified for replacement or as having failed, method 500 returns to block 506 where storage controller 122 continues to track the input/output statistics 414 for each of the DASs 412.

In response to one of the SDs (i.e. SD 1 232) having been identified for replacement or as having failed, storage controller 122 sorts the DAS list 222 based on the frequency of writes 418 from the lowest frequency of writes to the highest frequency of writes (block 512). Storage controller 122 determines the least written to data address space that has not been previously copied (i.e. DAS 0007 of FIG. 4) on DAS list 222 within the identified SD based on the input/output statistics 414 and specifically based on the frequency of writes 418 (block 514).

Storage controller 122 prevents writes to the least written to DAS (i.e. DAS 0007 of FIG. 4) (block 516) and copies the data contained in the least written to DAS from the SD identified for replacement or failed (i.e. SD 1 232) to the replacement or spare SD 240 (block 518). At decision block 520, storage controller 122 determines if all of the data has been copied from the SD identified for replacement or that has failed (i.e. SD 1 232) to the replacement or spare SD 240. In response to all of the data not having been copied from the SD identified for replacement or failed (i.e. SD 1 232) to the replacement or spare SD 240, storage controller 122 marks the copied DAS on DAS list 222 as having been copied (yes in copied to replacement drive 420) (block 521) and returns to block 514, where storage controller 122 determines the next least written to data address space that has not been previously copied (i.e. DAS 0004 of FIG. 4) on DAS list 222 within the identified SD based on the input/output statistics 414 and specifically based on the frequency of writes 418.

Storage controller 122 prevents writes to the next least written to DAS (i.e. DAS 0004 of FIG. 4) (block 516) and copies the data contained in the next least written to DAS that has not been previously copied from the SD identified for replacement or failed (i.e. SD 1 232) to the replacement or spare SD 240 (block 518). Storage controller 122 iterates through blocks 514-518 repeating the steps of determining additional next least written to DAS that have not been copied, preventing writes to the next least written to DAS and copying the data contained in the additional least written to DAS that have not been copied, until all of the data from the SD identified for replacement or that has failed (i.e. SD 1 232) has been copied to the replacement or spare SD 240.

In response to all of the data having been copied from the SD identified for replacement or that has failed (i.e. SD 1 232) to the replacement or spare SD 240, storage controller 122 performs a consistency check on the copied data (block 522). The consistency check detects parity and block errors on the copied data written to spare SD 240. If errors occur during the consistency check, the copied data can be re-written with the correct data. Storage controller 122 determines (decision block 524) if the consistency check has passed (i.e. there are no errors on the copied data). In response to the consistency check passing, method 500 ends. In response to the consistency check not passing, storage controller 122 re-copies the data to spare SD 240 (block 526).

Storage controller 122 determines (decision block 528) if a pre-determined threshold maximum number of re-copy attempts have been exceeded. In response to the pre-determined maximum number of re-copy attempts having been exceeded, storage controller 122 sends or issues a copy failure notice that the copying of the data to spare SD 240 has failed (block 530). Method 500 then ends.

In response to the pre-determined maximum number of re-copy attempts not being exceeded, storage controller 122 repeats the consistency check on the re-copied data (block 522) and repeats determining if the consistency check has passed (decision block 524).

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of operating a redundant array of independent drives (RAID) storage system having a plurality of storage devices and a spare storage device, the method comprising:
    a storage controller tracking input/output statistics for the storage devices;
    determining that a first storage device storing data has been identified for replacement within the plurality of storage devices;
    in response to the first storage device having been identified for replacement:
        sorting a list of data address spaces for the first storage device from a lowest frequency access to a highest frequency access, based on the I/O statistics for each data address space;

determining a least written to data address space within the first storage device based on the input/output statistics; and copying data from the first storage device to the spare storage device in sequential order beginning with copying first data contained in a least written to data address space having lowest frequency access to data contained in a data address space having highest frequency access.

2. The method of claim 1, further comprising:

determining if all of the data contained on the first storage device has been copied to the spare storage device;

when all of the data contained on the first storage device has not been copied to the spare storage device, determining a next least written to data address space within the first storage device based on the input/output statistics; and copying second data contained in the next least written to data address space from the first storage device to the spare storage device.

3. The method of claim 2, further comprising:

marking the data address spaces that have been copied to the spare storage device as data address spaces that have been copied.

4. The method of claim 1, wherein the storage controller tracking input/output statistics for the storage devices further comprises:

generating a list of data address spaces for each active storage device;

tracking within the list of data address spaces, an associated frequency of access for each of the data access spaces; and automatically updating the associated frequency of access for each of the data access spaces whenever the data address space is written to and/or read from.

5. The method of claim 4, further comprising:

sorting the list of data address spaces for the first storage device based on the frequency of write operations, from the lowest frequency to the highest frequency.

6. The method of claim 1, further comprising:

preventing writes to the least written to data address space on the first storage device when the first data is being copied from the first storage device to the spare storage device.

7. The method of claim 1, wherein the storage controller initializes the RAID storage system, the initialization comprising:

generating a plurality of disk groups in the storage devices;

dividing the disk groups into a plurality of data address spaces; and generating a list of data address spaces for each disk group to track a frequency of write and read operations to each data address space.

8. The method of claim 1, further comprising:

performing a consistency check operation on the copied data on the spare storage device;

determining if the consistency check has passed; and in response to the consistency check not passing, re-copying the first data from the first storage device to the spare storage device, wherein the performing, determining, and re-copying is performed one or more times up to a pre-set threshold number of times greater than zero.

9. A redundant array of independent drives (RAID) storage system comprising:

a plurality of storage devices including a spare storage device;

a storage controller coupled to the plurality of storage devices for controlling storage operations, wherein the storage controller comprises logic that:

tracks input/output statistics for the storage devices;

determines if a first storage device storing data has been identified for replacement within the storage devices; and in response to the first storage device having been identified for replacement:

sorts a list of data address spaces for the first storage device from a lowest frequency access to a highest frequency access, based on the I/O statistics for each data address space;

determines a least written to data address space within the first storage device based on the input/output statistics; and copies the data within the data address spaces for the first storage device from the first storage device to the replacement storage device in sequential order from a data address space having lowest frequency access to a data address space having highest frequency of access, wherein the logic first copies first data contained in the least written to data address space from the first storage device to the spare storage device.

10. The storage system of claim 9, wherein the storage controller further comprises logic that:

determines if all of the data contained on the first storage device has been copied to the spare storage device;

when all of the data contained on the first storage device has not been copied to the spare storage device, determines a next least written to data address space within the first storage device based on the input/output statistics; and copies second data contained in the next least written to data address space from the first storage device to the spare storage device.

11. The storage system of claim 10, wherein the storage controller further comprises logic that:

marks the data address spaces that have been copied to the spare storage device as data address spaces that have been copied.

12. The storage system of claim 9, wherein the storage controller further comprises logic that:

generates a list of data address spaces for each active storage device;

tracks within the list of data address spaces, an associated frequency of access for each of the data access spaces; and automatically updates the associated frequency of access for each of the data access spaces whenever the data address space is written to and/or read from.

13. The storage system of claim 12, wherein the storage controller further comprises logic that:

sorts the list of data address spaces for the first storage device based on the frequency of write operations, from the lowest frequency to the highest frequency.

14. The storage system of claim 9, wherein the storage controller further comprises logic that:

prevents writes to the least written to data address space on the first storage device when the first data is being copied from the first storage device to the spare storage device.

15. The storage system of claim 9, wherein the RAID storage system is initialized by the storage controller further comprising logic that:
- generates a plurality of disk groups in the storage devices;
- divides the disk groups into a plurality of data address spaces; and
- generates a list of data address spaces for each disk group to track a frequency of write and read operations to each data address space.

16. The storage system of claim 9 wherein the storage controller further comprises logic that:
- performs a consistency check operation on the copied data on the spare storage device;
- determines if the consistency check has passed; and
- in response to the consistency check not passing, re-copies the first data from the first storage device to the spare storage device, wherein the performing, determining, and re-copying is performed one or more times up to a pre-set threshold number of times greater than zero.

17. An information handling system comprising:
one or more processors;
a storage system in communication with the one or more processors, the storage system comprising:
- a plurality of storage devices including a spare storage device; and
- a storage controller coupled to the plurality of storage devices, the storage controller having firmware executing thereon to provide control of storage system operations, wherein the firmware configures the storage controller to:
  - track input/output statistics for the storage devices;
  - determine if a first storage device storing data has been identified for replacement within the storage devices;
  - in response to the first storage device having been identified for replacement: sort a list of data address spaces for the first storage device from a lowest frequency access to a highest frequency access, based on the I/O statistics for each data address space; determine a least written to data address space within the first storage device based on the input/output statistics; and copy the data within the data address spaces for the first storage device from the first storage device to the replacement storage device in sequential order from a data address space having lowest frequency access to a data address space having highest frequency of access, wherein the controller first copies first data contained in the least written to data address space from the first storage device to the spare storage device.

18. The information handling system of claim 17, wherein the firmware further configures the storage controller to:
- determine if all of the data contained on the first storage device has been copied to the spare storage device;
- when all of the data contained on the first storage device has not been copied to the spare storage device, determine a next least written to data address space within the first storage device based on the input/output statistics; and
- copy second data contained in the next least written to data address space from the first storage device to the spare storage device.

19. The information handling system of claim 18, wherein the firmware further configures the storage controller to:
- mark the data address spaces that have been copied to the spare storage device as data address spaces that have been copied.

20. The information handling system of claim 17, wherein the firmware further configures the storage controller to:
- generate a list of data address spaces for each active storage device;
- track within the list of data address spaces, an associated frequency of access for each of the data access spaces; and
- automatically update the associated frequency of access for each of the data access spaces whenever the data address space is written to and/or read from.

21. The information handling system of claim 20, wherein the firmware further configures the storage controller to:
- sort the list of data address spaces for the first storage device based on the frequency of write operations, from the lowest frequency to the highest frequency.

22. The information handling system of claim 17, wherein the firmware further configures the storage controller to:
- prevent writes to the least written to data address space on the first storage device when the first data is being copied from the first storage device to the spare storage device.

23. The information handling system of claim 17, wherein the RAID storage system is initialized by the firmware further configuring the storage controller to:
- generate a plurality of disk groups in the storage devices;
- divide the disk groups into a plurality of data address spaces; and
- generate a list of data address spaces for each disk group to track a frequency of write and read operations to each data address space.

24. The information handling system of claim 17, wherein the firmware further configures the storage controller to:
- perform a consistency check operation on the copied data on the spare storage device;
- determine if the consistency check has passed; and
- in response to the consistency check not passing, re-copy the first data from the first storage device to the spare storage device, wherein the performing, determining, and re-copying is performed one or more times up to a pre-set threshold number of times greater than zero.

* * * * *